United States Patent
Bellouard et al.

(10) Patent No.: US 7,237,852 B2
(45) Date of Patent: Jul. 3, 2007

(54) METHOD AND DEVICE FOR CONTROLLING AND BRAKING AN AIRCRAFT RUNNING ON THE GROUND

(75) Inventors: Rémi Bellouard, Toulouse (FR); Gérard Mathieu, Pibrac (FR)

(73) Assignee: Airbus France, Toulouse (FR)

( * ) Notice: Subject to any disclaimer, the term of this patent is extended or adjusted under 35 U.S.C. 154(b) by 12 days.

(21) Appl. No.: 11/101,414

(22) Filed: Apr. 8, 2005

(65) Prior Publication Data

US 2005/0231031 A1 Oct. 20, 2005

(30) Foreign Application Priority Data

Apr. 16, 2004 (FR) .................................. 04 03974

(51) Int. Cl.
*B60T 8/86* (2006.01)
(52) U.S. Cl. ................... 303/125; 303/9.62; 303/113.5
(58) Field of Classification Search ................ 303/125, 303/9.62, 15, 140, 194, 113.5, 115.2; 11/11, 11/94
See application file for complete search history.

(56) References Cited

U.S. PATENT DOCUMENTS

| | | | | |
|---|---|---|---|---|
| 4,006,941 A | * | 2/1977 | DeVlieg | ..................... 303/126 |
| 4,923,056 A | * | 5/1990 | Nedelk | ....................... 188/71.1 |
| 5,172,960 A | * | 12/1992 | Chareire | ...................... 303/191 |
| 5,217,282 A | * | 6/1993 | Guichard | .................... 303/9.73 |
| 5,397,173 A | * | 3/1995 | Bourguet | ....................... 303/2 |
| 5,417,477 A | * | 5/1995 | Lasbleis | ........................ 303/3 |
| 5,845,975 A | * | 12/1998 | Wells | ......................... 303/126 |
| 6,029,931 A | | 2/2000 | Encarthe et al. | |
| 6,604,708 B1 | * | 8/2003 | DeVlieg | ...................... 244/111 |
| 6,663,192 B2 | * | 12/2003 | Bourguet et al. | ............. 303/15 |

OTHER PUBLICATIONS

Preliminary Search Report dated Sep. 29, 2004 with English translation.

* cited by examiner

*Primary Examiner*—Devon Kramer
(74) *Attorney, Agent, or Firm*—Stevens, Davis, Miller & Mosher, LLP

(57) ABSTRACT

Method and device for controlling and braking an aircraft running on the ground

According to the invention, the aircraft (1) comprises two close undercarriage wheel assemblies (2D, 2G) and two distant undercarriage wheel assemblies (3D, 3G), the biggest of the braking commands (FD, FG) can, under certain conditions, be applied not only to the corresponding two undercarriage wheel assemblies, but also to the close undercarriage wheel assembly corresponding to the smallest braking command.

10 Claims, 3 Drawing Sheets

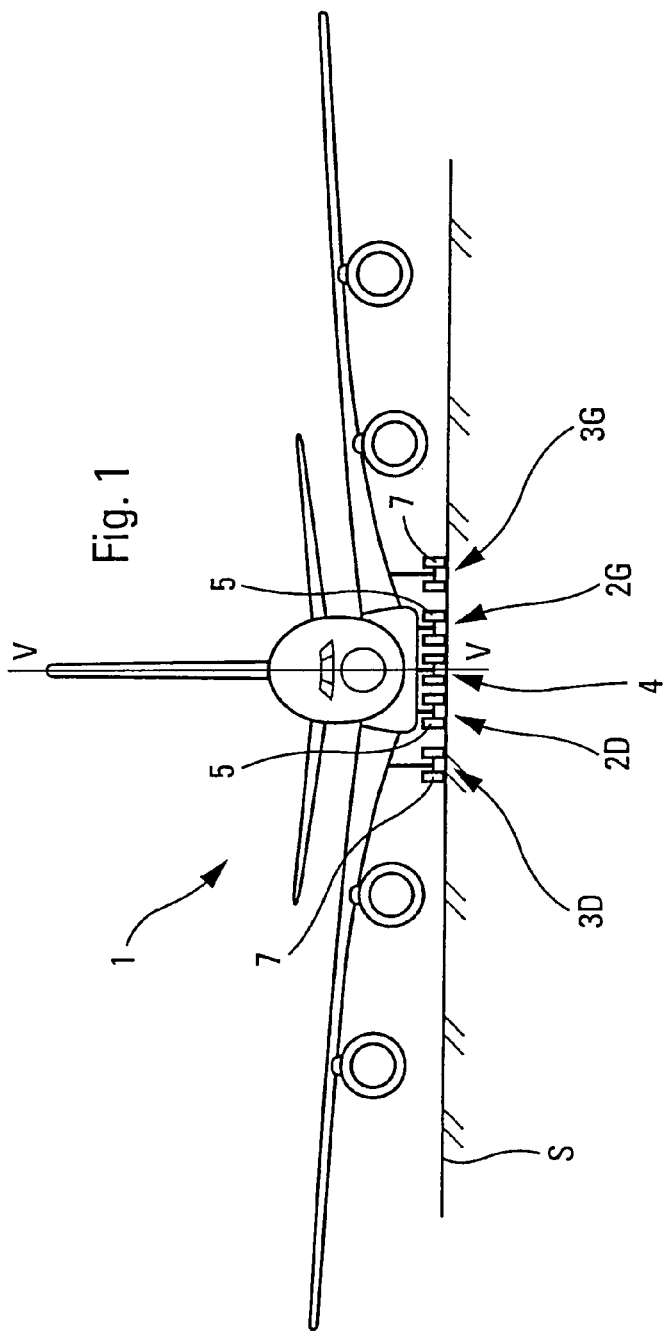
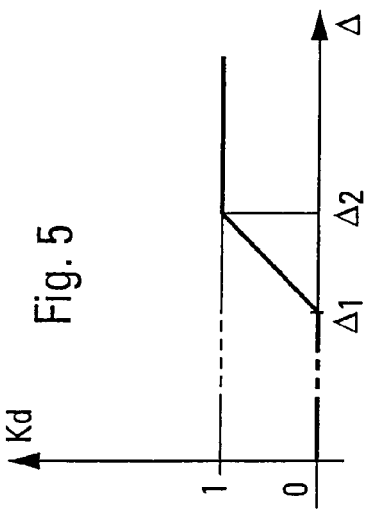
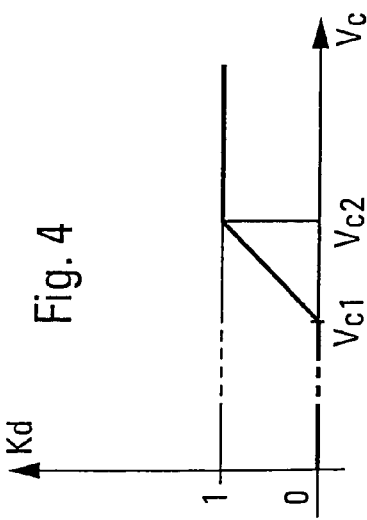

METHOD AND DEVICE FOR CONTROLLING AND BRAKING AN AIRCRAFT RUNNING ON THE GROUND

FIELD OF THE INVENTION

The present invention relates to a method and a device for controlling and braking and aircraft running on the ground and to an aircraft equipped with such a device.

BACKGROUND OF THE RELATED ART

It is known the braking of aircraft on the ground is provided by brakes installed on the wheels of undercarriage units and by airbrakes capable of increasing the drag of the aircraft and of pressing the latter onto the ground in order to increase the efficiency of the wheel brakes and/or of the thrust reversers, the wheel brakes being controlled by a system capable of taking account of commands coming from the pilot or from an automatic device.

It is also known that controlling an aircraft on the ground, that is to say controlling the yaw of the said aircraft, is principally ensured by the rudder and by the front undercarriage unit, disposed close to the nose of the latter (commonly called the "nose wheel"), but also by differential braking between the sets of wheels disposed on ether side of the longitudinal axis of the aircraft.

In order to brake the aircraft on the ground, the pilot has two pedals mounted on the rudder bar and respectively associated with the brakes of the wheels disposed on either side of the said longitudinal axis: thus, the right pedal can control the brakes disposed on the right hand side of the aircraft and the left pedal can control the brakes disposed on the left hand side of the latter.

It will be noted that such a device has the disadvantage that the differential braking level and the deceleration level are closely related and depend solely on the position of the said pedals.

Moreover, aircraft are known, generally large aircraft, that comprise at least two pairs of undercarriage wheel assemblies, such that the two undercarriage wheel assemblies of each pair are symmetrical with each other with respect to the median longitudinal vertical plane of such an aircraft and that the two undercarriage wheel assemblies (hereafter referred to as close undercarriage wheel assemblies) of one of the said pairs are closer to the said median longitudinal vertical plane than the two undercarriage wheel assemblies (hereafter referred to as distant undercarriage wheel assemblies) of the other one of the said pairs, each wheel of an undercarriage wheel assembly being equipped with an individual brake.

SUMMARY OF THE INVENTION

The purpose of the present invention is to overcome, for such an aircraft, the above-mentioned disadvantage by making it possible to modify the differential braking—deceleration relationship by acting on the distribution of braking between the different undercarriage wheel assemblies as a function of various parameters, in order to adapt the deceleration and the controlling of the aircraft as well as possible to the situation encountered by the pilot, and therefore to improve the safety of the said aircraft.

For this purpose, according to the invention, the method of controlling and braking an aircraft running on the ground and comprising at least two pairs of undercarriage wheel assemblies such as mentioned above, as well as two braking control devices available to the pilot of the aircraft, each of the said devices being associated with two undercarriage wheel assemblies disposed on a same side of the said median longitudinal vertical plane and generating a braking command capable of controlling the brakes of the two associated undercarriage wheel assemblies, is noteworthy in that:

the said braking commands are compared;

the smallest braking command is applied only to the brakes of the distant undercarriage wheel assembly with which the braking control device generating this smallest command is associated; and the biggest braking command is applied not only to the brakes of the two undercarriage wheel assemblies with which the control device generating this biggest braking command is associated, but also to the brakes of the close undercarriage wheel assembly associated with the braking control device generating the said smallest braking command.

Thus, according to the invention, the braking capability of the aircraft is greatly increased since it is possible to brake three undercarriage units, instead of two, using the biggest braking command. It will be noted that, since the third undercarriage unit braked according to the invention is a close undercarriage unit (and therefore having only a small lever arm), this results in only a little yaw braking moment effect on the aircraft.

However, when the pilot applies a strong differential action on the braking control devices in order to obtain a large yaw command and when the speed of the aircraft is high, it is important to provide the pilot with maximum yaw efficiency in order to be able to correct the path of the aircraft as quickly as possible and to avoid a lateral exit from the runway.

For this purpose, in a preferred implementation of the method according to the present invention:

the running speed of the aircraft is compared with a first threshold;

the absolute value of the difference between the said braking commands is compared with a second threshold;

when the running speed of the aircraft is lower than the said first threshold, irrespective of the position of the said absolute value with respect to the said second threshold, or when the said absolute value is lower than the said second threshold, irrespective of the position of the said running speed with respect to the said first threshold, the smallest braking commend is applied only to the brakes of the distant undercarriage wheel assembly with which the braking control device generating this smallest braking command is associated, whereas the biggest braking command is applied not only to the brakes of the two undercarriage wheel assemblies with which the braking control device generating this biggest braking command is associated, but also to the brakes of the close undercarriage wheel assembly associated with the braking control device generating the smallest braking command; and when, simultaneously, the running speed of the aircraft is higher than the said first threshold and the said absolute value is higher than the said second threshold, each of the said braking commands controls the brakes of the two undercarriage wheel assemblies associated with the corresponding braking control device.

Preferably, when the running speed of the aircraft or the said absolute value of the difference in braking commands pass on either side of the corresponding threshold, the change of braking mode takes place progressively.

Moreover, a device according to the present invention for controlling and braking an aircraft running on the ground and provided with undercarriage wheel assemblies and braking control devices such as described above, is noteworthy in that it comprises braking distribution means receiving the two braking commands and provided with means capable of comparing the latter and in that the said braking distribution means apply the smallest braking command only to the brakes of the distant undercarriage wheel assembly with which the braking control device generating this smallest braking command is associated, and applying the biggest braking command not only to the brakes of the two undercarriage wheel assemblies with which the braking control device generating this biggest braking command is associated, but also to the brakes of the close undercarriage wheel assembly associated with the braking control device generating the said smallest braking command.

In such a device, it is advantageous that:

the said braking distribution means comprise calculation means capable of comparing the running speed of the aircraft with a first threshold;

the said comparison means address the said means for calculating the difference between the said braking commands and the said calculating means compare the absolute value of this difference with a second threshold;

when the running speed of the aircraft is lower than the said first threshold, irrespective of the position of the said absolute value with respect to the said second threshold, or when the said absolute value is lower than the said second threshold, irrespective of the position of the said running speed with respect to the said first threshold, the said braking distribution means apply the smallest braking command only to the brakes of the distant undercarriage wheel assembly with which the braking control device generating this smallest braking command is associated, whereas the said braking distribution means apply the biggest braking command not only to the brakes of the two undercarriage wheel assemblies with which the braking control device generating that biggest braking command is associated, but also to the brakes of the close undercarriage wheel assembly associated with the braking control device generating the smallest braking command; and when, simultaneously, the running speed of the aircraft is higher than the said first threshold and the said absolute value is higher than the said second threshold, the said braking distribution means apply each of the said braking commands to the brakes of both undercarriage wheel assemblies associated with the corresponding braking control device.

Advantageously, the said braking distribution means comprise:

two direct connections respectively connecting the said braking control devices to the wheel brakes of the distant undercarriage units;

two first controlled conduction elements, capable of respectively connecting the said braking control devices to the wheel brakes of the close undercarriage units, the passing and non-passing states of the said first elements being synchronous and controlled by the said calculating means; and two second controlled conduction means capable of respectively connecting an output of the comparison means on which the biggest of the said braking commands appears to the wheel brakes of the close undercarriage units, the passing and non-passing states of the said second elements being synchronous, but opposite to those of the said first elements, and controlled by the said calculation means.

In order that the functioning of the device according to the present invention does not include any abrupt variation, the changing of the said first and second controlled conduction elements from one of their states to the other is progressive.

For this purpose, the said first and second controlled conduction elements can be variable controlled gain amplifiers and adders can be disposed respectively between the first and second controlled conduction elements and the wheel brakes of a same close undercarriage unit.

The present invention of course also relates to an aircraft comprising a device for controlling and braking such as described above.

BRIEF DESCRIPTION OF THE DRAWINGS

The figures of the appended drawing will give a good understanding of how the invention may be embodied. In these figures, identical references refer to similar elements.

FIG. 1 is a front view of a civilian heavy-transport aircraft to which the present invention can be applied.

FIGS. 4 and 5 are diagrams schematically and partially illustrating the functioning of the example of embodiment shown in FIG. 3.

DETAILED DESCRIPTION OF THE INVENTION

Figure 2:
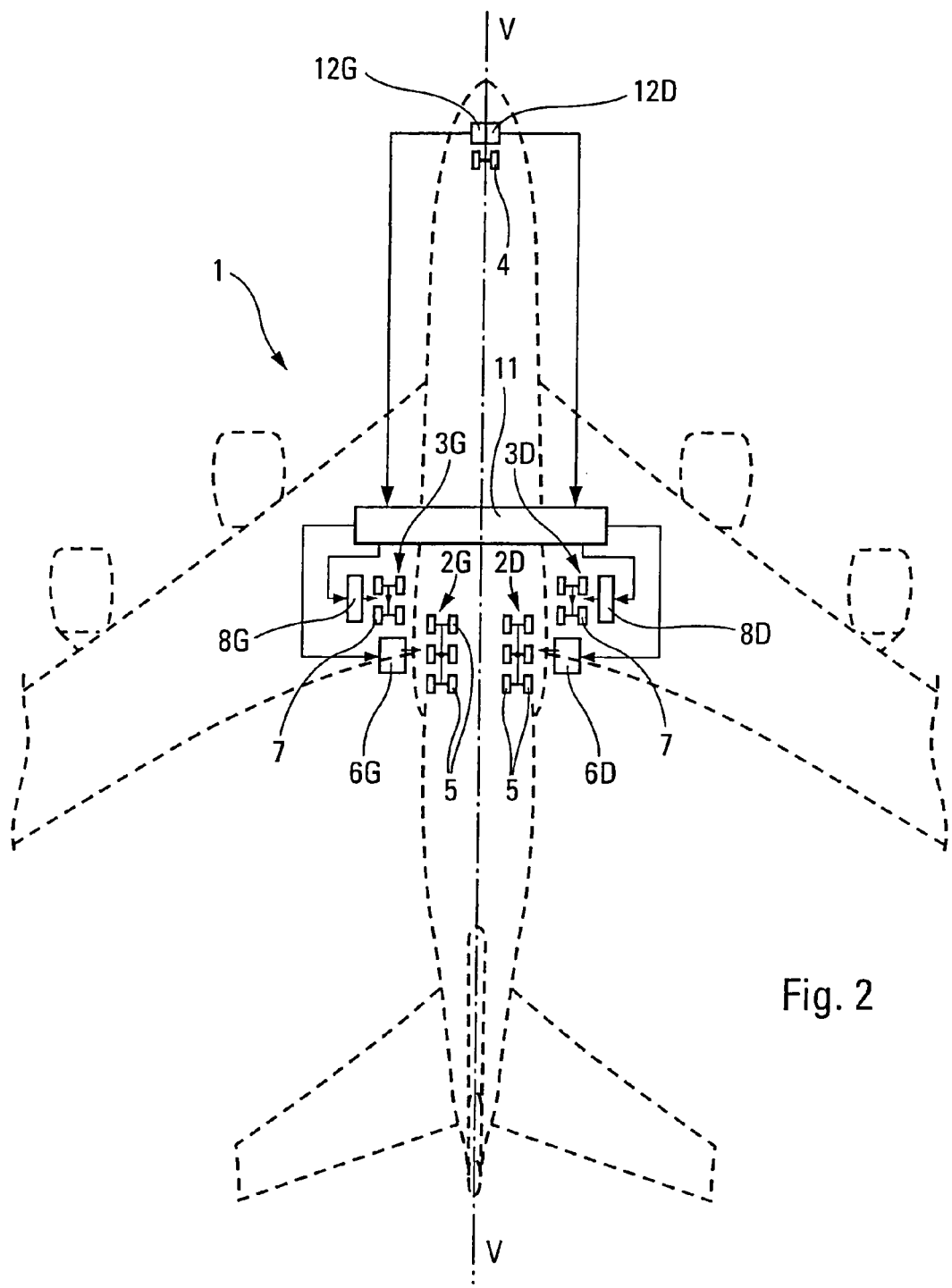
FIG. 2 is a partial plan view of the civilian aircraft shown in FIG. 1 with only the outline of the said aircraft being shown in order to reveal the location of the various undercarriage wheel assemblies.

The aircraft 1, shown schematically in FIGS. 1 and 2 and running of the ground S, comprises two pairs of undercarriage wheel assemblies 2G, 2D and 3G, 3D respectively, and a front undercarriage unit 4, disposed close to the nose of the aircraft 1 (commonly called a "nose wheel").

The two undercarriage wheel assemblies 2G and 2D, disposed on the left and on the right respectively of the aircraft 1, are symmetrical with each other with respect to the median longitudinal vertical plane V-V of the aircraft 1. Similarly, the two undercarriage wheel assemblies 3G and 3D, also disposed on the left and on the right respectively of the aircraft 1, are symmetrical with each other with respect to the said plane V-V. On the other hand, the two undercarriage wheel assemblies 2G and 2D are closer to the said plane V-V (and therefore to each other) than the undercarriage wheel assemblies 3G and 3D.

Each wheel 5 of the close undercarriage units 2G and 2D is equipped with an individual brake (represented by the reference 9 in FIG. 3) and the individual brakes of each of the undercarriage units 2G and 2D are controlled by a control device 6G or 6D respectively.

Similarly, each wheel 7 of the distant undercarriage units 3G and 3D is equipped with an individual brake (represented by the reference 10 in FIG. 3) and the individual brakes of each of the undercarriage units 3G and 3D are respectively controlled by a control device 8G or 8D.

The control devices 6G, 6D, 8G and 8D are themselves controlled by a braking distribution device 11, receiving left FG and right FD braking commands from two devices, a left one 12G and a right one 12D, available to the pilot.

As will be seen hereafter, the left braking command FG is especially used for braking the wheels 7 of the left distant undercarriage unit 3G and can be used for braking the wheels 5 of the left close undercarriage unit 2G and the wheels 5 of the right close undercarriage unit 2D. Similarly, the right braking command FD is especially used for braking the wheels 7 of the right distant undercarriage unit 3D and can be used for braking the wheels 5 of the right close undercarriage unit 2D and the wheels 5 of the left close undercarriage unit 2G.

Other braking devices (not shown) are preferably made available to a co-pilot of the aircraft 1.

Figure 3:
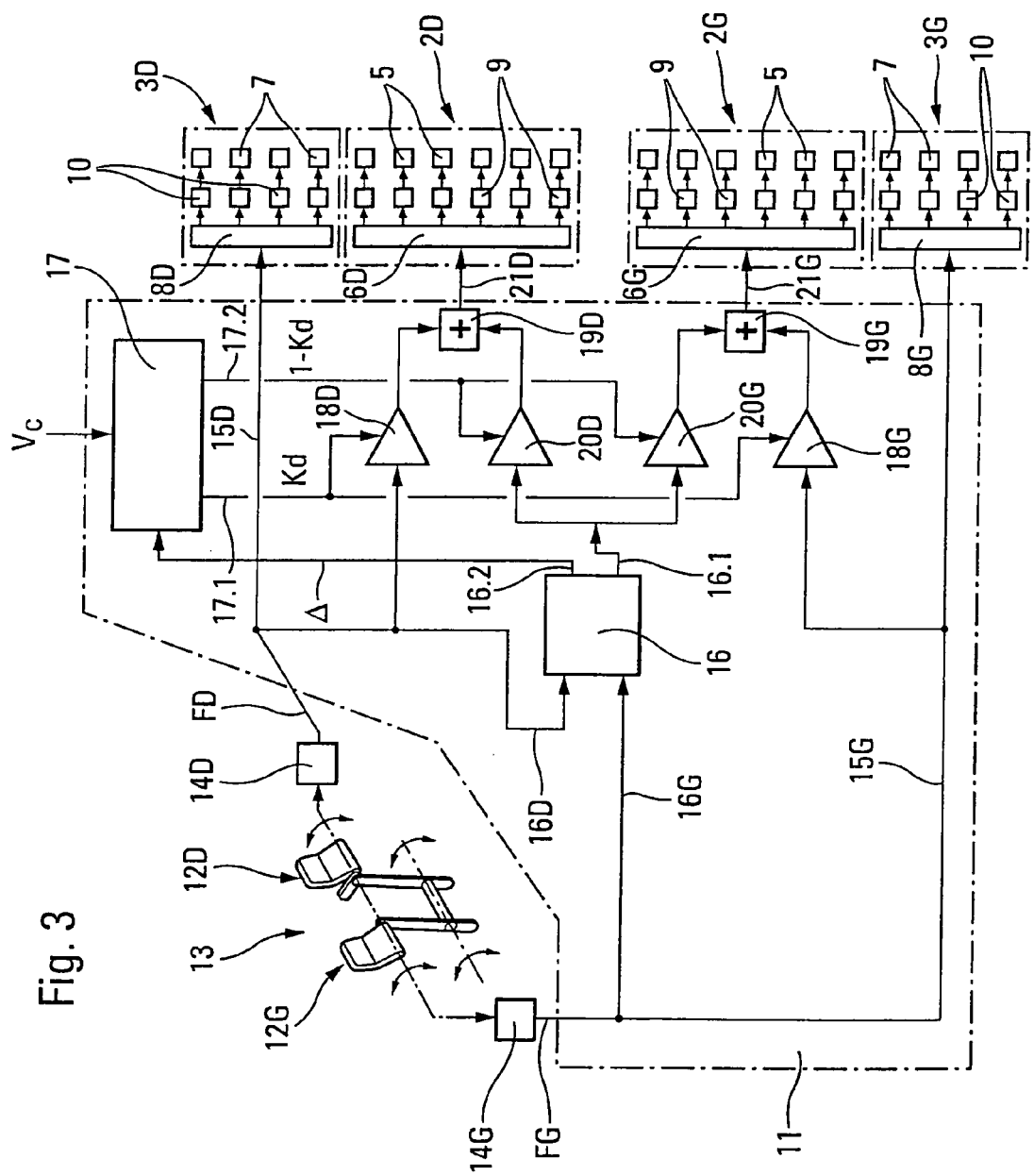
FIG. 3 is a block diagram of an example of embodiment of the braking device according to the present invention.

As shown schematically in FIG. 3, the said braking devices 12G and 12D can consist of rotary pedals, respectively articulated on the free ends of levers of the rudder bar 13 of the aircraft 1.

When the pilot, with his left (or right) foot causes the left pedal 12G (or right pedal 12D) to rotate, the rotation of the said pedal is detected by a left transducer 14G (or by a right transducer (14D), which generates the corresponding left braking command FG (or right braking command FD), sent to the said braking distribution device 11.

In the example of embodiment shown schematically in FIG. 3, the braking distribution device 11 comprises:

a direct connection 15D between the transducer 14D and the control device 8D making it possible to apply the braking command FD to the latter;

a direct connection 15G between the transducer 14G and the control device 8G making it possible to apply the braking command FG to the latter;

a comparison device 16, receiving the braking commands FD and FG respectively on its inputs 16D and 16G and provided with two outputs 16.1 and 16.2 upon which respectively appear the biggest of the said commands FD and FG and the absolute value Δ of the difference between these two commands FD and FG;

a calculator 17 receiving, from the comparison device 16, the said absolute value Δ and, from a sensor (not shown) fitted on board the aircraft 1, the measurement of the running speed Vc of the latter on the ground S, the said calculator 17 calculating in the way described hereafter, from Δ and from Vc, values Kd and 1-Kd, available at its outputs 17.1 and 17.2 respectively;

a variable gain amplifier 18D, whose input receives the command FD and whose output is connected to an adder 19D, the gain control input of the said amplifier 18D being connected to the output 17.1 of the calculator 17 in order to receive the value Kd as a gain value;

a variable gain amplifier 18G, whose input receives the command FG and whose output is connected to an adder 19G the gain control input of the said amplifier 18G being connected to the output 17.1 of the calculator 17 in order to receive the value Kd as a gain value;

a variable gain amplifier 20D, whose input is connected to the output 16.1 of the comparison device 16 and whose output is connected to the adder 19D, the gain control input of the said amplifier 20D being connected to the output 17.2 of the calculator 17 in order to receive the value 1-Kd as a gain value;

a variable gain amplifier 20G, whose input is connected to the output 16.1 of the comparison device 16 and whose output is connected to the adder 19G, the gain control input of the said amplifier 20G being connected to the output 17.2 of the calculator 17 in order to receive the value 1-Kd as a gain value;

a connection 21D between the output of the adder 19D and the control device 6D; and a connection 21G between the output of the adder 19G and the control device 6G.

As shown schematically and partially in FIGS. 4 and 5, the calculator 17 can calculate the gain Kd as follows:

if the running speed Vc is less than or equal to a value Vc1 (for example equal to 40 knots), Kd is equal to zero (and therefore 1-Kd is equal to 1), whatever the value of Δ may be;

if the absolute value Δ of the difference between the braking commands FD and FG is less than or equal to a value Δ1 (for example equal to 70% of the maximum value of Δ obtained when one of the pedals 12G or 12D is pushed down to the maximum whilst the other pedal 12D or 12G does not undergo any rotation by the action of the pilot), Kd is equal to zero (and therefore 1-Kd is equal to 1), whatever the value of Vc may be;

if the running speed Vc is greater than or equal to a value Vc2 higher than Vc1 (for example equal to 60 knots) and if the absolute value of Δ is greater than or equal to a value Δ2 (for example equal to 80% of the said maximum value of Δ), Kd is equal to 1 (and therefore 1-Kd is equal to zero);

if the running speed Vc is greater than or equal to Vc1, but less than or equal to Vc2 and if Δ is greater than or equal to Δ2, Kd is equal to Vc-Vc1/Vc2-Vc1 (and therefore 1-Kd is equal to Vc2-Vc/Vc2-Vc1);

if the running speed Vc is greater than or equal to Vc2 and if Δ is greater than or equal to Δ1 but less than or equal to Δ2, Kd is equal to Δ-Δ1/Δ2-Δ1 (and therefore 1-Kd is equal to Δ2-Δ/Δ2-Δ1);

if the running speed Vc is greater than or equal to Vc1 and less than or equal to Vc2 and if Δ is greater than or equal to Δ1 and less than or equal to Δ2:

Kd is equal to Δ-Δ1/Δ2-Δ1 and 1-Kd is equal to Δ2-Δ/Δ2-Δ1 if Δ-Δ1/Δ2-Δ1 is less than or equal to Vc-Vc1/Vc2-Vc1;

Kd is equal to (Vc-Vc1)/(Vc2-Vc1) and 1-Kd is equal to Vc2-Vc/Vc2-Vc1 if Δ-Δ1/Δ2-Δ1 is greater than or equal to Vc-Vc1/Vc2-Vc1.

Thus, the gains Kd and 1-Kd can assume either the value 0 or the value 1 and can change continuously from one to the other whilst assuming intermediate values.

Furthermore, it can be seen that, depending on the parameter constituted by the running speed Vc and on the parameter constituted by the absolute value Δ of the difference between the braking commands FD and FG commanded by the pilot, the functioning of the braking distribution device 11 can be divided into three domains, namely:

a first domain itself consisting of three zones in which the following conditions are respectively satisfied:

first zone: the speed Vc is low, less than Vc1, and the difference Δ is also low, less than Δ1;

second zone: the speed Vc is high, greater than Vc1, but the difference Δ is low, less than Δ1; and third zone: the speed Vc is low, less than Vc1, but the difference Δ is high, greater than Δ1;

in the three zones of this first domain, that is to say in the totality of the latter, the calculator 17 delivers a zero gain Kd, such that the amplifiers 18D and 18G are inactive, whereas the gain 1-Kd is equal to 1, such that the amplifiers 20D and 20G are active. Consequently:

the braking command FD is sent to the control device 8D by the connection 15D and the wheels 7 of the distant undercarriage unit 3D are consequently braked;

the braking command FG is sent to the control device 8G by the connection 15G and the wheels 7 of the distant undercarriage unit 3G are consequently braked;

the biggest of the braking commands FD and FG appearing at the output 16.1 of the comparison device 16 is sent simultaneously to the control devices 6D and 6G respectively through the amplifier 20D, the adder 19D and the connection 21D and through the amplifier 20G, the adder 19G and the connection 21G, such that the wheels 5 of the close undercarriage units 2D and 2G are also braked;

in this first functioning domain, it is noteworthy to observe that the wheels 5 of one of the close undercarriage units, the right one 2D or the left one 2G, are braked by the braking command FG or FD associated with the opposite side;

a second domain in which the speed Vc is high (greater than Vc2) and the difference Δ is also big (greater than Δ2), which signifies that the pilot is applying strong differential braking at high speed in order to obtain a large yaw action; in this second domain, the gain Kd is equal to 1, such that the amplifiers 18D and 18G are active, whereas the gain 1-Kd is zero, such that the amplifiers 20D and 20G are inactive. Subsequently:

the braking command FD is sent to the control device 8D by the connection 15D and the wheels 7 of the distant undercarriage unit 3D are consequently braked;

the braking command FG is sent to the control device 8G by the connection 15G and the wheels 7 of the distant undercarriage unit 3G are consequently braked;

the braking command FD is sent to the control device 6D through the amplifier 18D and the adder 19D and the wheels 5 of the close undercarriage unit 2D are braked in a way similar to that of the wheels 7 of the distant undercarriage unit 3D;

the braking command FG is sent to the control device 6G through the amplifier 18G and the adder 19G and the wheels 5 of the close undercarriage unit 2G are braked in a way similar to that of the wheels 7 of the distant undercarriage unit 3G;

in this second domain, all of the wheels 5 and 7 of the right close undercarriage unit 2D (or left close undercarriage unit 2G) and of the right distant undercarriage unit 3D (or left distant undercarriage unit 3G) are braked by the right braking command FD (or left braking command FG) and there is no relationship between the right braking command FD and the wheels 5 and 7 of the close left undercarriage unit 2G and of the distant left undercarriage unit 3G, nor between the left braking command FG and the wheels 5 and 7 of the close right undercarriage unit 2D and of the distant right undercarriage unit 3D; and a third domain which serves as a continuous transition between the said first and second domains and which comprises a first zone in which the speed Vc is between Vc1 and Vc2 and the difference Δ is greater than Δ1 and a second zone in which the difference Δ is between Δ1 and Δ2 and the speed Vc is greater than Vc1; in this third domain, the gain Kd changes progressively from the value 0 to the value 1 (or inversely from the value 1 to the value 0), whereas the gain 1-Kd consequently changes progressively from the value 1 to the value 0 (or inversely from the value 0 to the value 1), such that the amplifiers 18D and 18G become progressively active (or, inversely, progressively inactive) whereas the amplifiers 20D and 20G become progressively inactive (or, inversely, progressively active), the adders 19D and 19G providing the continuity of the braking controls of the wheels 5 of the close undercarriage units 2D and 2G.

The invention claimed is:

1. A method of controlling and braking an aircraft running on the ground that has:
    at least two pairs of undercarriage wheel assemblies such that the two undercarriage wheel assemblies of each pair are symmetrical with each other with respect to a median longitudinal vertical plane of such an aircraft and that the two undercarriage wheel assemblies, hereafter referred to as close undercarriage wheel assemblies, of one of the pairs are closer to the median longitudinal vertical plane than the two undercarriage wheel assemblies, hereafter referred to as distant undercarriage wheel assemblies, of the other one of the pairs, each wheel of the undercarriage wheel assemblies being equipped with an individual brake; and
    two braking control devices available to the pilot of the aircraft, each of the devices being associated with two undercarriage wheel assemblies disposed on a same side of the median longitudinal vertical plane and generating a braking command capable of controlling the brakes of the two associated undercarriage wheel assemblies,
the method comprising:
    comparing the braking commands;
    applying a smallest braking command, having a value greater than zero, only to the brakes of the distant undercarriage wheel assembly with which the braking control device generating a smallest command is associated; and
    applying a biggest braking command not only to the brakes of the two undercarriage wheel assemblies with which the control device generating a biggest braking command is associated, but also to the brakes of the close undercarriage wheel assembly associated with the braking control device generating the smallest braking command.

2. The method as claimed in claim 1, further comprising:
    comparing a running speed of the aircraft with a first threshold;
    comparing an absolute value of a difference between the braking commands with a second threshold; and
    when the running speed of the aircraft is lower than the first threshold, irrespective of the position of the absolute value with respect to the second threshold, or when the absolute value is lower than the second threshold, irrespective of the position of the running speed with respect to the first threshold, applying the smallest braking command only to the brakes of the distant undercarriage wheel assembly with which the braking control device generating the smallest braking command is associated, and applying the biggest braking command not only to the brakes of the two undercarriage wheel assemblies with which the braking control device generating the biggest braking command is associated, but also to the brakes of the close undercarriage wheel assembly associated with the braking control device generating the smallest braking command, wherein:
    when, simultaneously, the running speed of the aircraft is higher than the first threshold and the absolute value is higher than the second threshold, each of the braking commands controls the brakes of the two undercarriage wheel assemblies associated with the corresponding braking control device.

3. The method as claimed in claim 2, wherein when the running speed of the aircraft passes on either side of the first threshold or the absolute value of the difference in braking commands passes on either side of the second threshold, the change of braking mode takes place progressively.

4. A device for controlling and braking an aircraft running on the ground, the aircraft comprising:

at least two pairs of undercarriage wheel assemblies such that the two undercarriage wheel assemblies of each pair are symmetrical with each other with respect to a median longitudinal vertical plane of such an aircraft and that the two undercarriage wheel assemblies, hereafter referred to as close undercarriage wheel assemblies, of one of the pairs are closer to the median longitudinal vertical plane than the two undercarriage wheel assemblies, hereafter referred to as distant undercarriage wheel assemblies, of the other one of the pairs, each wheel of an undercarriage wheel assembly being equipped with an individual brake; and two braking control devices available to the pilot of the aircraft, each of the braking control devices being associated with two undercarriage wheel assemblies disposed on a same side of the median longitudinal vertical plane and generating a braking command capable of controlling the brakes of the two associated undercarriage wheel assemblies, the device for controlling and braking an aircraft comprising:

a braking distribution device that receives the two braking commands and that includes a comparator that compares the two braking commands, wherein the braking distribution device:

applies a smallest braking command, having a value greater than zero, only to the brakes of the distant undercarriage wheel assembly with which the braking control device generating a smallest braking command is associated, and applies a biggest braking command not only to the brakes of the two undercarriage wheel assemblies with which the braking control device generating the biggest braking command is associated, but also to the brakes of the close undercarriage wheel assembly associated with the braking control device generating the smallest braking command.

5. The device as claimed in claim 4, wherein:

the braking distribution device comprises a calculator that compares a running speed of the aircraft with a first threshold;

the comparator addresses the calculator and the calculator compares an absolute value the difference between the braking commands with a second threshold;

when the running speed of the aircraft is lower than the first threshold, irrespective of the position of the absolute value with respect to the second threshold, or when the absolute value is lower than the second threshold, irrespective of the position of the running speed with respect to the first threshold, the braking distribution device applies the smallest braking command only to the brakes of the distant undercarriage wheel assembly with which the braking control device generating the smallest braking command is associated, whereas the braking distribution device applies the biggest braking command not only to the brakes of the two undercarriage wheel assemblies with which the braking control device generating the biggest braking command is associated, but also to the brakes of the close undercarriage wheel assembly associated with the braking control device generating the smallest braking command; and when, simultaneously, the running speed of the aircraft is higher than the first threshold and the absolute value is higher than the second threshold, the braking distribution device applies each of the braking commands forces to the brakes of both undercarriage wheel assemblies associated with the corresponding braking control device.

6. The device as claimed in claim 5, wherein the braking distribution device comprises:

two direct connections respectively connecting the braking control devices to the wheel brakes of the distant undercarriage units;

two first controlled conduction elements, capable of respectively connecting the braking control devices to the wheel brakes of the close undercarriage units, the connection states of the first elements being synchronous and controlled by the calculator; and two second controlled conduction elements capable of respectively connecting an output of the comparator on which the biggest of the braking commands appears to the wheel brakes of the close undercarriage units, the connection states of the second elements being synchronous, but opposite to those of the first elements, and controlled by the calculator.

7. The device as claimed in claim 6, wherein the changing of the first and second controlled conduction elements from one of their states to the other is progressive.

8. The device as claimed in claim 6, wherein the first and second controlled conduction elements are variable controlled gain amplifiers.

9. The device as claimed in claim 7, wherein adders are disposed respectively between the first and second controlled conduction elements and the wheel brakes of a same close undercarriage unit.

10. An aircraft, wherein it comprises a controlling and braking control device as claimed in claim 4.

* * * * *